United States Patent
Widmann

(10) Patent No.: US 9,813,361 B2
(45) Date of Patent: Nov. 7, 2017

(54) METHOD FOR SELECTIVELY TURNING OFF A SWITCH IN A SWITCH ARRANGEMENT FOR CURRENT DISTRIBUTION, AND CORRESPONDING SWITCH ARRANGEMENT

(71) Applicant: Siemens Aktiengesellschaft, Munich (DE)

(72) Inventor: Stefan Widmann, Freudenberg (DE)

(73) Assignee: Siemens Aktiengesellschaft, Munich (DE)

(*) Notice: Subject to any disclaimer, the term of this patent is extended or adjusted under 35 U.S.C. 154(b) by 96 days.

(21) Appl. No.: 14/618,649

(22) Filed: Feb. 10, 2015

(65) Prior Publication Data

US 2015/0288623 A1    Oct. 8, 2015

(30) Foreign Application Priority Data

Apr. 2, 2014  (DE) .................. 10 2014 206 249

(51) Int. Cl.
   *G01R 31/08*  (2006.01)
   *H04L 12/939*  (2013.01)
   (Continued)

(52) U.S. Cl.
   CPC .............. *H04L 49/557* (2013.01); *H02J 1/00* (2013.01); *H04L 41/0654* (2013.01); *H04W 28/04* (2013.01)

(58) Field of Classification Search
   CPC ..................................................... H04W 28/04
   See application file for complete search history.

(56) References Cited

U.S. PATENT DOCUMENTS 7,289,432 B2 * 10/2007 Hosoi ................... H04L 1/22
                                                     370/218
8,711,686 B2 *  4/2014 Takagi ............ H04L 41/0659
                                                     370/218
(Continued)

FOREIGN PATENT DOCUMENTS

DE        102013216939 A1     3/2014

OTHER PUBLICATIONS

German Report on Examination dated Oct. 14, 2014 for corresponding German Application No. 102014206249.7.

*Primary Examiner* — Mohammad Anwar
*Assistant Examiner* — Angel Brockman
(74) *Attorney, Agent, or Firm* — Harness, Dickey & Pierce P.L.C.

(57) ABSTRACT

A method is disclosed for selectively turning off a switch arrangement for current distribution. A corresponding switch arrangement is also disclosed, including an upstream switch and a directly downstream switch connected in series, each switch being configured to check a current condition associated therewith. Connected between the upstream switch and the downstream switch is a communication link onto which the downstream switch puts a delay signal if its current condition is met and there is no fault present. Following reception of the delay signal, the upstream switch opens only after a delay time. In order to ensure turning off when there is a fault in the opening of a downstream switch even in the case of small overcurrents, when the current condition is met and the fault that prevents opening occurs, the downstream switch puts a fault report onto the communication link that trips the upstream switch.

6 Claims, 1 Drawing Sheet

(51) Int. Cl.
*H04L 12/24* (2006.01)
*H02J 1/00* (2006.01)
*H04W 28/04* (2009.01)

(56) References Cited

U.S. PATENT DOCUMENTS

2003/0128035 A1* 7/2003 Mody ................ H01H 71/2445
324/424
2008/0077836 A1* 3/2008 Khoche ............ G01R 31/31917
714/733
2009/0257157 A1* 10/2009 Vicente ................ H02H 7/30
361/42

* cited by examiner

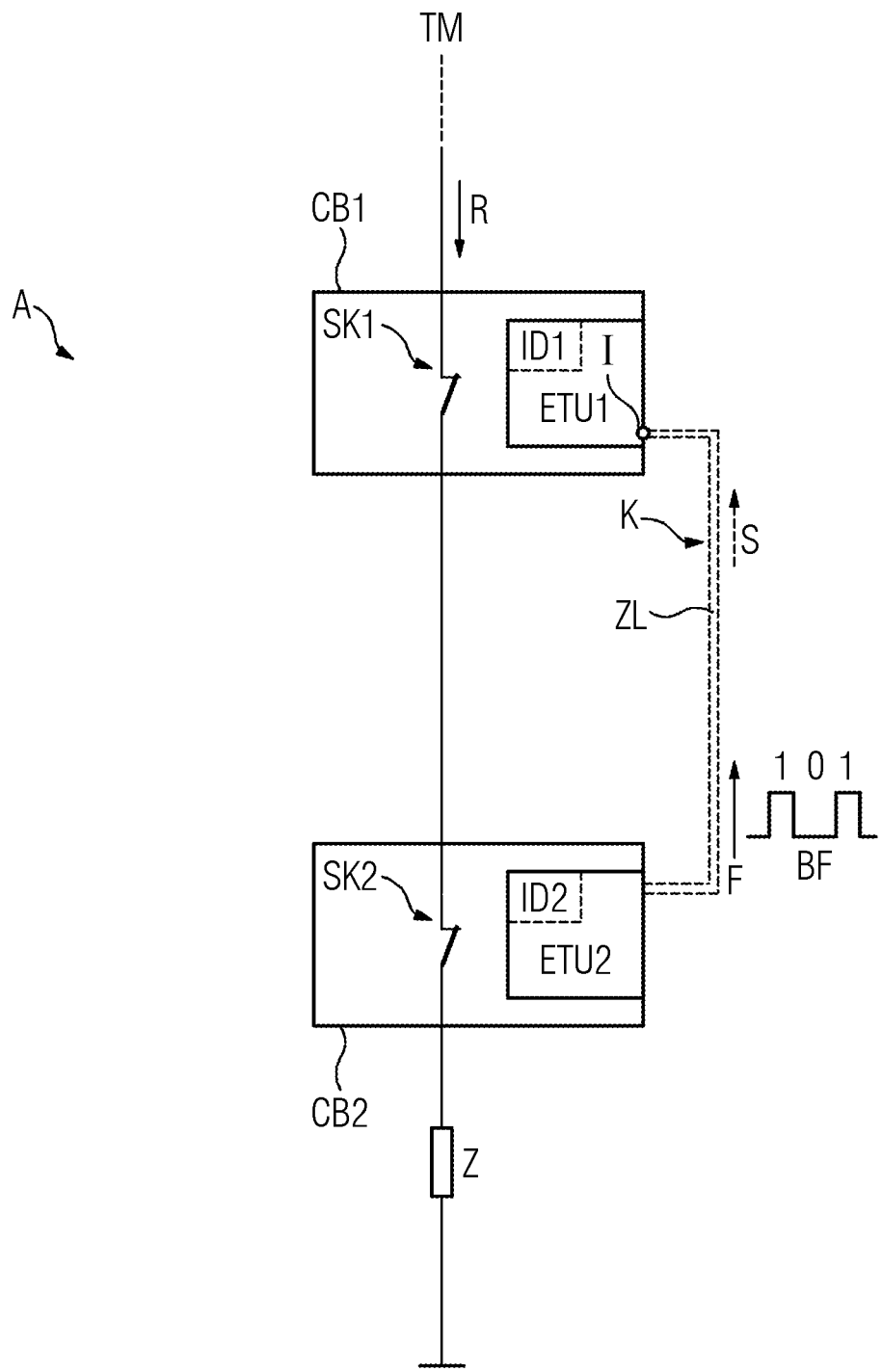

METHOD FOR SELECTIVELY TURNING OFF A SWITCH IN A SWITCH ARRANGEMENT FOR CURRENT DISTRIBUTION, AND CORRESPONDING SWITCH ARRANGEMENT

PRIORITY STATEMENT

The present application hereby claims priority under 35 U.S.C. §119 to German patent application number DE 102014206249.7 filed Apr. 2, 2014, the entire contents of which are hereby incorporated herein by reference.

FIELD

At least one embodiment of the invention generally relates to a method for selectively turning off when there is a fault in the opening of a downstream switch in a switch arrangement for current distribution and/or to a corresponding switch arrangement.

BACKGROUND

It is known practice for the current in a current distribution system to be distributed to individual installation paths (loads) by way of a switch arrangement. The switches, particularly circuit breakers for the low voltage domain, which are usually arranged in groups or distribution levels, are each designed for a rated current and interrupt the current flowing through the switch in the event of a fault, that is to say when there is a short circuit, for example.

To this end, they operate a latching solenoid with a displaceable push rod (maglatch), for example, that acts on a prestressed breaker shaft that opens the switch. Only the installation path that is affected by the fault or that is closest to the fault is turned off in each case. This behavior is called selective turning off.

Each switch contains a transformer and a trip unit. The transformer has a wire coil (Rogowski coil), for example, and senses the current that flows through the switch, and the trip unit checks whether a prescribed current condition is met.

For the purpose of selective turning off (also known as zone selective interlocking ZSI), the switches arranged in groups communicate with one another via appropriate links (communication links) that each connect the switches in a downstream group to the switches in the directly upstream group. The links may be in the form of two-wire lines or in the form of bus links and the like.

Thus, a—as seen from the supply—downstream switch (in a downstream group) whose current condition is met communicates this to the—as seen from the supply—directly upstream switch (in the directly upstream group) by means of an appropriate signal (blocking signal, delay signal). As a result, the upstream switch, which likewise detects the short circuit on account of the continuous flow of energy, does not trip itself for the time being, but rather waits a particular time (a prescribed delay time) to determine whether the downstream switch trips. If the downstream switch has not tripped after the delay time has elapsed, the upstream switch interrupts the flow of current itself.

The communication path is in the direction of the supply in each case, that is to say contrary to the direction of energy flow, from the downstream switch to the directly upstream switch (in each case from a downstream group to the directly upstream group).

If, when the current condition is met, a downstream switch establishes that it has a problem that prevents tripping, e.g. a fault in the form of a blocked or faulty maglatch or a fractured wire in a Rogowski coil, it can distribute this information, possibly by way of communication in the system, but this does not rectify the fault directly. Particularly in the case of small overcurrents that are not detected as a fault current in the upstream switch on account of their low level, there is the risk of the faulty switch severely overheating (and of there being a fire in the switch).

SUMMARY

At least one embodiment of the invention is directed to solving, or at least improving upon, at least one of the aforementioned problem in a technically simple manner.

A method and a switch arrangement are disclosed. The subclaims are advantageous embodiments.

For the method of at least one embodiment, when the current condition is met and a fault occurs, the downstream switch puts not a delay signal but rather a fault report onto the communication link if the fault prevents the downstream switch from opening. Further, the upstream switch is opened without delay following reception of the fault report, regardless of whether or not its current condition (the current condition of the upstream switch) is met. If, when the current condition is met, the downstream switch establishes that it has a problem (fault) that prevents tripping, then this problem is now rectified by virtue of said downstream switch allowing the upstream switch to trip.

For the switch arrangement of at least one embodiment, when the current condition is met and a fault that prevents the downstream switch from opening occurs, the downstream switch puts not a delay signal but rather a fault report in the form of a serial bit string onto the communication link. Further, the upstream switch trips without delay following reception of the fault report regardless of whether or not its current condition (the current condition of the upstream switch) is met.

BRIEF DESCRIPTION OF THE DRAWINGS

The invention is described in more detail below with reference to at least one embodiment and a drawing.

The single FIGURE of the drawing shows a switch arrangement A for current distribution using two switches CB1, CB2 that are in the form of low voltage circuit breakers and that are connected to a power supply TM.

DETAILED DESCRIPTION OF THE EXAMPLE EMBODIMENTS

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the FIGURE. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks will be stored in a machine or computer readable medium such as a storage medium or non-transitory computer readable medium. A processor(s) will perform the necessary tasks.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments may be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

Note also that the software implemented aspects of the example embodiments may be typically encoded on some form of program storage medium or implemented over some type of transmission medium. The program storage medium (e.g., non-transitory storage medium) may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

For the method of at least one embodiment, when the current condition is met and a fault occurs, the downstream switch puts not a delay signal but rather a fault report onto the communication link if the fault prevents the downstream switch from opening. Further, the upstream switch is opened without delay following reception of the fault report, regardless of whether or not its current condition (the current condition of the upstream switch) is met. If, when the current condition is met, the downstream switch establishes that it has a problem (fault) that prevents tripping, then this problem is now rectified by virtue of said downstream switch allowing the upstream switch to trip.

For the switch arrangement of at least one embodiment, when the current condition is met and a fault that prevents the downstream switch from opening occurs, the downstream switch puts not a delay signal but rather a fault report in the form of a serial bit string onto the communication link. Further, the upstream switch trips without delay following reception of the fault report regardless of whether or not its current condition (the current condition of the upstream switch) is met.

Advantageously, it is proposed that the fault report is in the form of a serial bit string.

The single FIGURE of the drawing shows a switch arrangement A for current distribution using two switches CB1, CB2 that are in the form of low voltage circuit breakers and that are connected to a power supply TM. The switch CB2 is, as seen from the power supply TM in the direction of energy flow R, directly downstream of the switch CB1, and the switch CB1 is accordingly directly upstream of the switch CB2. The switch CB2 has a load Z connected to it and has no further switch downstream.

Each switch CB1, CB2 has associated mechanical switching contacts SK1, SK2, the adjacent contact elements of which carry the current (generally the electric power). In addition, each switch CB1, CB2 has an electronic trip unit ETU1, ETU2, each of which checks whether the current flowing through the associated switch CB1, CB2 via the switching contacts SK1, SK2 meets a prescribed current condition, in this case whether a current threshold is exceeded.

In addition, the switches CB1, CB2 are connected to one another by means of a two-wire line ZL via their trip units ETU1, ETU2.

All the switches CB1, CB2 turn off selectively, i.e. they open selectively, which is also known as zone selective interlocking (ZSI). To this end, when the current condition is met for the current flowing via the switching contact SK2, that is to say when there is a short circuit in the load Z, for example, the trip unit ETU2 of the downstream switch CB2 uses the two-wire line ZL to send a delay signal S to the trip unit ETU1 of the directly upstream switch CB1, assuming that the downstream switch CB2 is not prevented from opening by a fault.

The current condition for the trip unit ETU1 of the upstream switch CB1 is likewise met when there is a short circuit, for which reason the trip unit ETU1 would immediately trip without receiving the delay signal S, but trips after a delay on the basis of the received delay signal S. In this case, the delay time of switch CB1 is 50 ms by way of example. If the switch CB2 has still not tripped after the 50 ms have elapsed, the upstream switch CB1 itself trips.

The two-wire line ZL forms an open circuit together with a current source for the upstream switch CB1. The delay signal S is sent to the trip unit ETU1 by virtue of the trip unit ETU2 completing the circuit.

Since the switch CB2 effectively forms the bottommost group (distribution level) in the switch arrangement, it trips without delay (apart from the unavoidable inherent delay related to design).

In this case, the two-wire line ZL forms a communication link K between the switches CB1 and CB2 in a generalized manner.

If, when the current condition is met, the trip unit ETU2 of the switch CB2 establishes that there is a fault present that prevents (the switch CB2) from opening, a fault report F rather than a delay signal is put onto the communication link K and the upstream switch CB1 is opened without delay following reception of the fault report F. The upstream switch CB1 is tripped regardless of whether or not its current condition (that is to say the current condition of the upstream switch CB1) is met, particularly since a small overcurrent from the upstream switch CB1 would possibly not result in (the switch CB1) tripping on account of its low level. An excessively small current is sometimes not detected as a fault current F by the upstream switch CB1, while the switch CB2 would trip without a fault.

In this case, the fault report F is in the form of a serial bit string BF and is therefore distinctly different than the delay signal S.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program, tangible computer readable medium and tangible computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a tangible computer readable medium and is adapted to perform any one of the aforementioned methods when run on a computer device (a device including a processor). Thus, the tangible storage medium or tangible computer readable medium, is adapted to store information and is adapted to interact with a data processing facility or computer device to execute the program of any of the above mentioned embodiments and/or to perform the method of any of the above mentioned embodiments.

The tangible computer readable medium or tangible storage medium may be a built-in medium installed inside a computer device main body or a removable tangible medium arranged so that it can be separated from the computer device main body. Examples of the built-in tangible medium include, but are not limited to, rewriteable non-volatile memories, such as ROMs and flash memories, and hard disks. Examples of the removable tangible medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for selectively turning off a switch in a switch arrangement for current distribution, in the switch arrangement, as seen from a supply, one switch is upstream and one other switch is directly downstream of the one switch, each of the upstream switch and the downstream switch having a current condition different from the other, current flowing through the downstream switch also flows via the upstream switch, wherein each of the switches is configured to automatically check whether the current condition associated therewith is met, and wherein the upstream switch and the downstream switch are connected to one another via a communication link, the method comprising:
   putting a respective delay signal onto the communication link, by the downstream switch, if the current condition associated with the downstream switch is met and no fault occurs that prevents the downstream switch from opening, wherein the upstream switch, following reception of the delay signal, does not open at least for a prescribed delay time;
   putting by the downstream switch, when the current condition is met and a fault that prevents the downstream switch from tripping occurs, a fault report onto the communication link, and
   tripping the upstream switch, in response to reception of the fault report, when the current condition of the downstream switch is met and the current condition of the upstream condition is not met.

2. The method as claimed in claim 1, wherein the fault report is in the form of a serial bit string.

3. A switch arrangement for current distribution comprising:
   a upstream switch, as seen from a supply; and
   a downstream switch, directly downstream of the upstream switch, each of the switches being configured to automatically check whether a current condition associated therewith is met and each of the upstream switch and the downstream switch having a current condition different from the other, wherein the switches are configured such that current to flow through the directly downstream switch will also flow via the upstream switch; and
   a communication link, between the upstream switch and the downstream switch, the downstream switch being configured to put a delay signal onto the communication link to indicate to the upstream switch that its current condition is met and there is no fault present that prevents the downstream switch from opening, wherein the upstream switch, following reception of the delay signal, is configured to not open at least for a prescribed delay time, and the downstream switch being further configured to, when the current condition is met and a fault that prevents the downstream switch from opening occurs, put a fault report onto the communication link,
   wherein the upstream switch is configured to trip in response to reception of the fault report when the current condition of the downstream switch is met and the current condition of the upstream condition is not met.

4. The switch arrangement of claim 3, wherein the fault report is in the form of a serial bit string.

5. An upstream switch for a switch arrangement for current distribution, comprising:
- a pre-stressed breaker shaft configured to open the switch;
- a latching solenoid with a displaceable push rod that acts on the pre-stressed breaker shaft;
- a transformer configured to sense a current that flows through the upstream switch;
- a trip unit configured to check, whether a prescribed current condition is met;
- wherein the upstream switch is configured to communicate with a downstream switch via a communication link;
- wherein the upstream switch is further configured to receive, via the communication link, an delay signal of the downstream switch communicating that the current condition of the downstream switch is met;
- wherein the upstream switch is configured to detect a short circuit on account of the continuous flow of energy and to not trip itself for the time being, but is rather configured to wait for a prescribed delay time to determine, whether the downstream switch trips, and if the downstream switch has not tripped after the delay time has elapsed, the upstream switch is configured to interrupt the flow of current itself; and
- wherein the upstream switch is additionally configured to receive, via the communication link, a fault report of the downstream switch if a fault prevents the downstream switch from opening, and, in response thereto, the upstream switch is configured to open without delay following reception of the fault report when the current condition of the downstream switch is met and the current condition of the upstream condition is not met.

6. The switch arrangement of claim 5, wherein the fault report is in the form of a serial bit string.

* * * * *